350-3.61 SR
XR 3,833,383

United States [11] 3,833,383
Ryan et al. [45] Sept. 3, 1974

[54] HOLOGRAPHIC RECORDING MEDIUM

[75] Inventors: Robert James Ryan; Louis Anthony, both of Di Marco, Trenton, N.J.

[73] Assignee: RCA Corporation, New York, N.Y.

[22] Filed: Aug. 18, 1972

[21] Appl. No.: 282,077

[52] U.S. Cl. .......... 96/84 R, 96/27 H, 96/75, 96/91 D, 350/3.5
[51] Int. Cl. .......... G03c 1/84
[58] Field of Search .......... 96/27 H, 84 R, 91 D, 75

[56] References Cited

UNITED STATES PATENTS

| | | | |
|---|---|---|---|
| 2,627,088 | 2/1953 | Alles | 96/87 A |
| 2,779,684 | 1/1957 | Alles | 117/7 |
| 3,469,985 | 9/1969 | Bailey | 96/84 |
| 3,658,526 | 4/1972 | Haugh | 96/27 H |

FOREIGN PATENTS OR APPLICATIONS

| | | | |
|---|---|---|---|
| 819,945 | 9/1959 | Great Britain | 96/87 A |

*Primary Examiner*—Ronald H. Smith
*Attorney, Agent, or Firm*—Glenn H. Bruestle; Birgit E. Morris

[57] ABSTRACT

A holographic recording medium having a non-blocking antihalation layer comprising a hydrophilic polymer having unreacted vinyl alcohol groups and an antihalation dyestuff.

4 Claims, 1 Drawing Figure

3833383
OR IN 96/84R

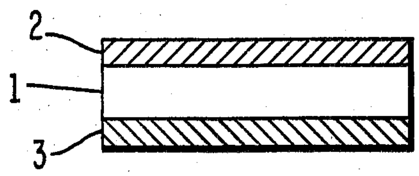

HOLOGRAPHIC RECORDING MEDIUM

This invention relates to an improved medium for holographic recording. More particularly, this invention provides a holographic recording medium having an effective antihalation layer which is non-blocking with respect to a photosensitive layer.

BACKGROUND OF THE INVENTION

Recording of redundant holograms in the form of a three-dimensional phase grating or relief pattern in an optical quality medium has been described by Bartolini et al., Applied Optics, Vol. 9, 2283 (1970). According to this system, coherent light is split into two beams, an object beam and a reference beam. The object beam passes through the object image to be recorded and is deflected to intersect the reference beam at the surface of a photosensitive medium, creating an interference pattern in the medium. Development of the photosensitive medium forms a three-dimensional relief pattern or phase grating on the surface corresponding to the video information recorded.

It is important that only the object and reference beams intersect at the recording surface. Any light from other sources will cause noise or distortion in the recorded image, detracting from its overall quality. "Noise" can be introduced from light waves diffracted from the edges of the optical fixtures employed, from dirt, scratches or other defects in the recording medium, and from light transmitted through the recording medium and reflected back to the recording surface. The latter source of noise can be minimized by providing an antihalation layer on the back surface of the recording medium. A practical antihalation composition for a holographic recording medium must fulfill three basic requirements; it must have an index of refraction the same as or similar to the recording medium to prevent the reflection of light off the recording medium-antihalant layer interface; it must absorb light transmitted through the recording medium to prevent the reflection of light from the coating-air interface; and it must be inert and nonadherent to the recording surface of the recording medium with which it may be contacted. Conventional antihalation coatings, for example such as are employed in the photographic art, are impractical because they adhere to photosensitive polymer compositions such as photoresists and cannot be separated without damage to the photoresist surface. This precludes storage of the recording medium in the form of tape or film wound on a reel.

SUMMARY OF THE INVENTION

We have discovered that certain hydrophilic resins can be combined with suitable dyestuffs and applied to a suitable substrate to form an antihalation coating for a holographic recording medium. The resultant coating is non-blocking and can be contacted with a photosensitive layer without adhering thereto or causing damage to any information recorded thereon.

BRIEF DESCRIPTION OF THE FIGURE

The FIGURE is a cross-sectional view of a recording medium of the invention.

DETAILED DESCRIPTION OF THE INVENTION

The recording medium suitable for holographic recording comprises a transparent, optical quality, planar substrate having a photosensitive layer on one side and a non-blocking antihalation layer on the opposite side, which antihalation layer comprises a hydrophilic polymer having unreacted vinyl alcohol groups and a suitable light-absorbent antihalation dyestuff dissolved therein.

The substrate for the recording medium herein described can be a transparent, optical quality planar support, such as glass or a clear polymeric substrate, suitably of an acrylic resin, acetate resin or a polyethylene terephthalate resin. Preferably the support is flexible, conveniently in the form of tape or film, which can be readily stored until required. Oriented polyethylene terephthalate tape of optical quality is readily available commercially in a variety of widths and thicknesses and with excellent controlled smooth surfaces and is therefore presently preferred.

The photosensitive layer is conventional and is sensitive to coherent light. It can be, for example, a layer of a photoresist, either of the positive or negative type, but other conventional photosensitive materials can also be employed. Positive photoresists are highly sensitive to recording with coherent or laser light and are presently preferred. A suitable positive photoresist available commercially which has good sensitivity is AZ 1350 of Shipley Company. This photoresist is sensitive at the recording wavelength of the helum-cadmium laser (4416 A). The choice of photosensitive materials will be dependent on the recording wavelength, as is known. A solution of the photosensitive composition is applied to the substrate in conventional manner, as by roller coating, brush coating, doctor blading and the like so as to apply a uniform layer of the photosensitive material, suitably about 1 to 2 microns or more in thickness.

The antihalation layer comprises a non-blocking hydrophilic resin containing antihalation dyestuff. We have found that a polymer containing unreacted vinyl alcohol groups and a soluble dyestuff meets the required criteria discussed above for antihalant layers and is also non-blocking. Suitable polymers include homopolymers of vinyl alcohol or copolymers having at least about 5 percent by weight of residual, unreacted vinyl alcohol groups. Such polymers absorb water, providing a hydrophilic surface which is imcompatible with conventional photoresist surfaces. Particularly suitable copolymers of vinyl alcohol include copolymers of vinyl alcohol and a vinyl acetal. These copolymers are soluble in organic solvents which also dissolve a variety of organic dyestuffs and so are preferred herein. Copolymers of vinyl butyral and vinyl alcohol containing about 20 percent by weight of unreacted vinyl alcohol groups are particularly preferred. Such copolymers are available commercially from the Union Carbide Corporation as XYHL or XYSG resins which also contain a minor amount of vinyl acetate. The copolymer is admixed with a suitable curing agent and catalyst. Suitable curing agents are conventional and include thermosetting aminoaldehyde resins, such as urea-formaldehyde. Suitable catalysts are also well known and include p-toluene sulfonic acid. The resins are most conveniently applied from solution in a suitable solvent.

The dyestuff, which must be soluble in the hydrophilic polymer, is chosen so as to absorb light at the wavelength of the recording laser to be employed. For example, a dyestuff which absorbs at 4416 A, the wavelength of a helium-cadmium laser, is Orasol yellow 3R, available from Ciba-Geigy Corporation. Of course, when another recording wavelength is employed, another dyestuff may be substituted. The amount of dyestuff employed is not critical and an amount up to the maximum amount which is soluble in the hydrophilic resin can be employed. When less dyestuff is employed, a thicker layer of the antihalant film may be required to absorb the light transmitted through the recording medium. The optimum dyestuff concentration and polymer thickness for each system can be readily determined by one skilled in the art by a series of test runs.

In preparing the antihalation layer, preferably the resin is dissolved in a suitable solvent and the cross-linking agent and catalyst added. The dyestuff is dissolved in the resultant solution and the mixture filtered. The solution is applied to the substrate on the side opposite the photosensitive layer in conventional manner so as to apply a layer of suitable thickness. In most cases the antihalation layer will be about 1 to 2 microns in thickness. The coated substrate is then heated to evaporate the solvent and partially cross-link the resin. The time required for curing will depend on the temperature employed as well as the resin, catalyst and solvent employed. For example, drying and curing at 85°C. may be complete in about 15 minutes, whereas at lower temperatures of about 65°C., curing may require 2 hours or more for equivalent results. The optimum time and temperature cycle for each resin, catalyst and solvent employed can be readily determined by a series of test runs as will be known to one skilled in the art.

The order of applying the photosensitive layer and antihalation layer to the substrate is not critical but in general it is preferred to apply the antihalation layer and cure it prior to applying the photosensitive layer.

The preferred recording medium as hereindescribed in the form of a film or tape can be conveniently stored, before and after exposure and development of the photosensitive layer, wound on a reel or mandrel. Such tapes have the additional advantage that they can be read out after recording using conventional tape projection techniques as a quality check prior to replication.

Referring now to the FIGURE, a substrate film 1 has a photosensitive layer 2 on one side thereof and an antihalation layer 3 on the other side thereof.

The invention will be further illustrated by the following examples but it is to be understood that the invention is not meant to be limited to the details described therein. In the example, all parts and percentages are by weight.

EXAMPLE 1

Three parts of a vinyl butyral polymer having 20 percent of unreacted vinyl alcohol groups (XYHL resin from Union Carbide Corporation) was dissolved in a 60:40 ethyl cellosolve:ethanol solvent. One part of a urea formaldehyde resin (XB-1050 from American Cyanamid Co.) and 5 percent of the total resin solids of a p-toluene sulfonic acid catalyst (1010 of American Cyanamid Co.) were stirred in and sufficient additional solvent added to make a solution containing 3.25 percent solids. Forty percent of the resin solids of a yellow dyestuff, Orasol yellow 3R (Ciba-Geigy Corporation) was dissolved in the resultant solution.

The solution prepared as above was filtered and applied by roller coating to a biaxially oriented polyethylene terephthalate tape. The opposite side of the tape was then coated with a positive photoresist (AZ 1350 of Shipley Company), dried for two hours at 65°C. and wound on reels for storage.

Phase holograms were formed in the resultant film using a cadmium-helium laser following the procedure of Bartolini et al. described in *Applied Optics*, Vol. 9, 2283 (1970). The resultant film was wound on a reel and stored. During subsequent readout, no adhesion between the layers of the recording medium or damage to the holograms were noted.

Unrecorded and recorded films prepared as above were stored at room temperature wound on reels for over 6 months. No adverse effects on the films themselves or on the holographic information thereon was noted when unwound.

We claim:

1. A medium for recording holographic information comprising a transparent support, a positive photoresist layer on one side of the support and an antihalation layer on the opposite side of the support, the antihalation layer consisting essentially of a cured hydrophilic copolymer of a vinyl alcohol and a vinyl acetal having at least about 5 percent by weight of unreacted vinyl alcohol groups and a light-absorbent antihalation dyestuff dissolved therein.

2. A medium according to claim 1 wherein the vinyl alcohol polymer is a copolymer of vinyl alcohol and vinyl butyral.

3. A recording medium according to claim 1 wherein the support is a biaxially oriented optical quality polyethylene terephthalate film.

4. A medium according to claim 2 wherein the copolymer of vinyl alcohol and vinyl butyral contains about 20 percent by weight of the polymer of unreacted vinyl alcohol groups.

* * * * *

UNITED STATES PATENT OFFICE

CERTIFICATE OF CORRECTION

Patent No. 3,833,383 Dated September 3, 1974

Inventor(s) Robert James Ryan et al.

It is certified that error appears in the above-identified patent and that said Letters Patent are hereby corrected as shown below:

Inventor should read as follows:

Robert James Ryan; Louis Anthony Di Marco,
both of Trenton, N.J.

Signed and sealed this 7th day of January 1975.

(SEAL)
Attest:

McCOY M. GIBSON JR.
Attesting Officer

C. MARSHALL DANN
Commissioner of Patents

FORM PO-1050 (10-69)
3530 6/72

USCOMM-DC 60376-P69
★ U.S. GOVERNMENT PRINTING OFFICE : 1969 O—366-334